(12) United States Patent
Worthington

(10) Patent No.: US 7,312,805 B1
(45) Date of Patent: Dec. 25, 2007

(54) USER DEFINED WARPING TOOL

(75) Inventor: John W. Worthington, Minnetonka, MN (US)

(73) Assignee: Adobe Systems Incorporated, San Jose, CA (US)

( * ) Notice: Subject to any disclaimer, the term of this patent is extended or adjusted under 35 U.S.C. 154(b) by 190 days.

(21) Appl. No.: 10/674,633

(22) Filed: Sep. 29, 2003

(51) Int. Cl.
*G09G 5/00* (2006.01)
*G06T 13/00* (2006.01)

(52) U.S. Cl. ...................... 345/647; 345/473
(58) Field of Classification Search ........ 345/647–649, 345/660, 672, 619, 473
See application file for complete search history.

(56) References Cited

U.S. PATENT DOCUMENTS

| | | | |
|---|---|---|---|
| 5,854,634 A | 12/1998 | Kroitor | |
| 6,067,094 A | 5/2000 | Schuster | |
| 6,198,489 B1 | 3/2001 | Salesin et al. | |
| 6,201,549 B1 | 3/2001 | Bronskill | |
| 6,373,492 B1 | 4/2002 | Kroitor | |
| 6,377,712 B1 | 4/2002 | Georgiev et al. | |
| 6,573,889 B1 | 6/2003 | Georgiev | |
| 6,734,851 B2 | 5/2004 | Georgiev | |
| 6,765,589 B1 | 7/2004 | Georgiev et al. | |
| 7,098,932 B2 | 8/2006 | Georgiev et al. | |
| 2002/0089500 A1* | 7/2002 | Jennings et al. | 345/420 |
| 2003/0098872 A1* | 5/2003 | Georgiev | 345/647 |
| 2004/0056871 A1* | 3/2004 | Milliron | 345/647 |
| 2004/0085443 A1* | 5/2004 | Kallioniemi et al. | 348/135 |
| 2004/0165788 A1* | 8/2004 | Perez et al. | 382/284 |

OTHER PUBLICATIONS

Karl Sims, "Choreographed Image Flow ", 1992, The Journal of Visualization and Computer Animation, vol. 3, pp. 31-43.
McClelland, D. "Paint with vectors in Illustrator 8", 1999, Macworld vol. 16, No. 3, p. 97.

* cited by examiner

*Primary Examiner*—Ryan Yang
(74) *Attorney, Agent, or Firm*—Fish & Richardson P.C.

(57) ABSTRACT

Methods and apparatus, including computer program products, implement techniques for modifying an image. A warping tool has a perimeter having a shape and a size. The warping tool has one or more associated vectors each of which originates at a mesh point defined by a tool mesh associated with the warping tool. User input is received specifying one or more of the shape of the perimeter, the tool mesh, and the associated vectors. The warping tool is used to modify the image.

51 Claims, 9 Drawing Sheets

USER DEFINED WARPING TOOL

BACKGROUND

The present invention relates to techniques for modifying electronic images.

Image warping is a method of modifying an image by changing the spatial configuration of portions of the image. A source image can be warped into a destination image according to a specified mapping between the source image plane and the destination image plane.

Computer applications for image editing allow a user to warp an electronic image using an onscreen "brush", sometimes referred to as a "warping tool", controlled by an input device such as a mouse. The user can drag the warping tool along a trajectory from one location to another location within the image, thereby defining an envelope. Pixels of the image within the envelope are moved, creating a warping effect. For example, a sticky brush is a tool that moves pixels from the starting point of the envelope to its end. A slipping brush is a tool that moves the pixels from the starting point a distance less than, but proportional to, the length of the trajectory.

SUMMARY OF THE INVENTION

In general, in one aspect, the invention provides methods and apparatus, including computer program products, implementing techniques for modifying an image using a warping tool. The techniques include receiving user input specifying a warping tool. The warping tool has a perimeter having a shape and a size. The warping tool has one or more associated vectors where each of the vectors originates at a mesh point defined by a tool mesh associated with the warping tool. The user input specifies one or more of the shape of the perimeter, the tool mesh, and the associated vectors.

Advantageous implementations of the invention include one or more of the following features. In response to user input, the warping tool can be applied to an image having one or more image regions to define a distortion vector at each of the one or more image regions, and the image regions can be modified using the corresponding distortion vectors. Producing a warping effect can include repeatedly applying and modifying the warping tool. A representation of the modified image can be displayed. Receiving user input specifying the warping tool can include receiving user input specifying the tool mesh. Receiving user input specifying the warping tool can also include receiving user input defining the strength and/or the direction of the one or more associated vectors. Receiving user input defining the strength and or direction can include receiving user input defining a rotationally asymmetric distribution for the strengths or the directions. Receiving user input defining the strength and/or direction can include receiving user input defining a strength and/or direction that change with time. Receiving user input specifying the warping tool can include receiving user input specifying a rotationally asymmetric shape of the perimeter or receiving user input specifying the shape of the perimeter. Receiving user input specifying the warping tool can include receiving user input specifying a shape of the perimeter or a size that changes with time. Receiving user input specifying the shape of the perimeter can include receiving user input specifying a triangle, a square, hexagon, octagon, rhombus, or parallelepiped. Applying the warping tool can include applying the warping tool in response to user input defining a movement of the warping tool from a first location to a second location relative to the image. Applying the warping tool can include calculating a distortion vector for an image region based on the movement of the warping tool and one or more associated vectors. Applying the warping tool can include using a user specified scale factor, where the scale factor is used to scale the strengths of the associated vectors.

The invention can be implemented to realize one or more of the following advantages. The user can specify an arbitrary shape for the perimeter of the warping tool's region of influence. The user can define the strength and/or direction of the warping effect by defining one or more vectors associated with the warping tool. The shape of the region of influence can be rotationally asymmetric. The user can specify a rotationally asymmetric distribution for the strength and/or the direction of the vectors. One implementation of the invention provides all of the above advantages.

The details of one or more implementations of the invention are set forth in the accompanying drawings and the description below. Further features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
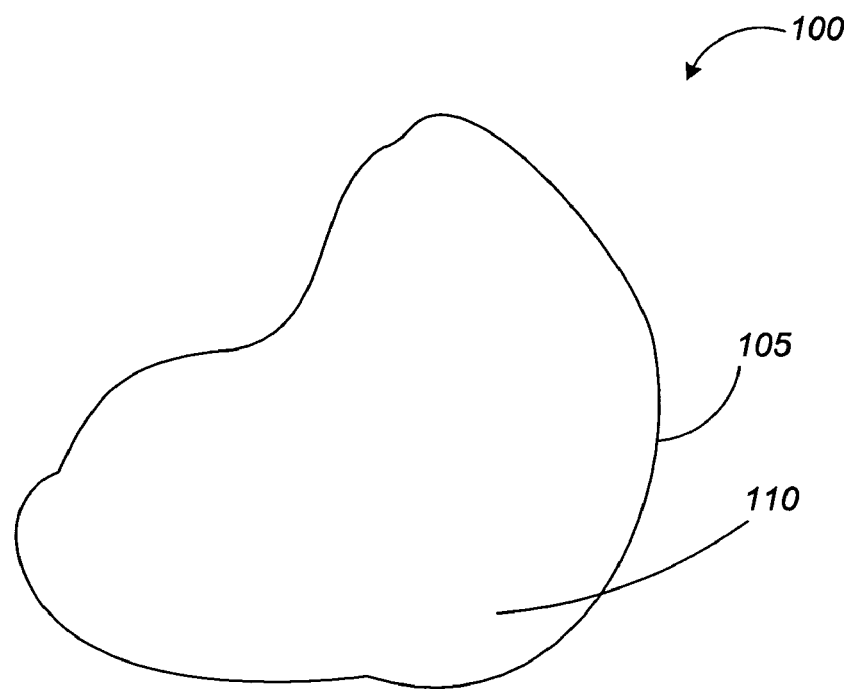
FIG. 1A illustrates the shape of an exemplary warping tool according to one aspect of the invention.
Figure 1B:
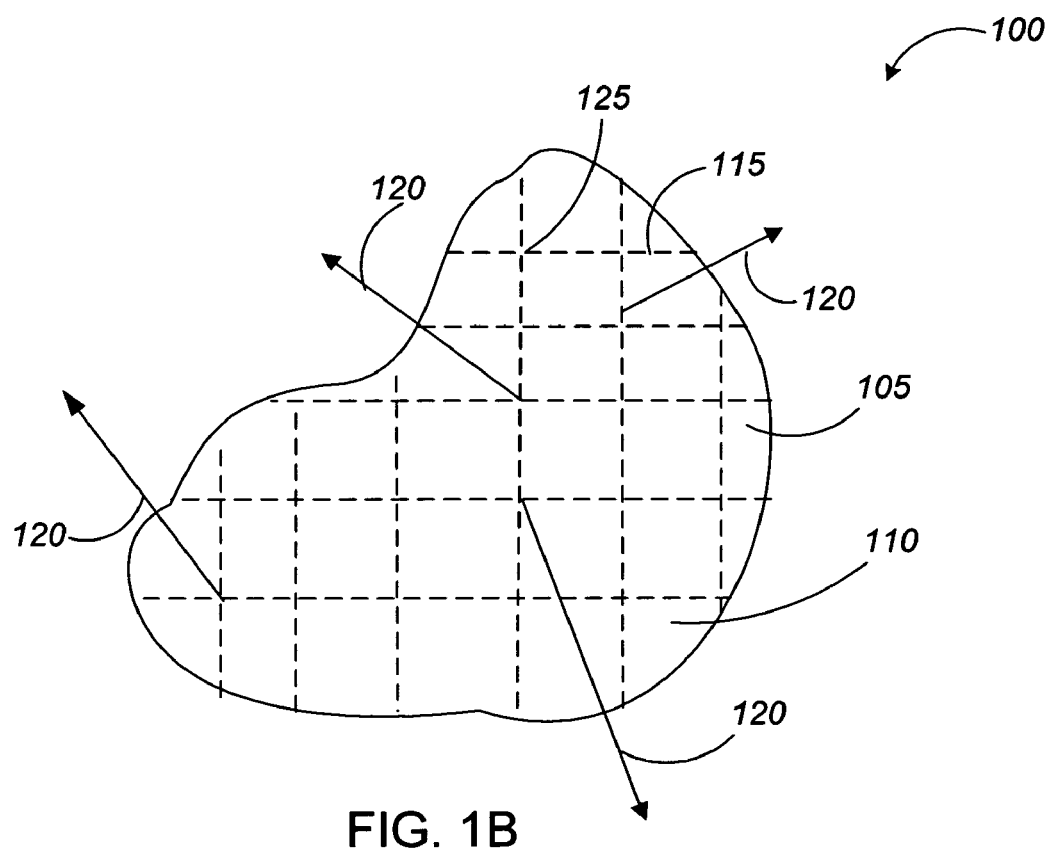
FIG. 1B illustrates a tool mesh and vectors associated with the exemplary warping tool.

FIG. 1A illustrates the shape of an exemplary warping tool 100 implemented in an image processing application in accordance with one aspect of the invention. The warping tool 100 has a tool mesh 115, and a perimeter 105 that defines a region of influence 110. The perimeter 105 has a shape and a size. The warping tool 100 has one or more vectors 120, each of which originates at a mesh point 125 of the tool mesh 115. A user of the image processing application can apply the warping tool 100 to an image displayed in the image processing application using conventional user interface techniques, such as by selecting a location in the image using a pointing device, such as a stylus or mouse.

When the warping tool 100 is applied to an image, the region of influence 110 covers one or more pixels in the image. A warping effect is applied to the covered pixels based at least in part on the warping tool vector or vectors, as will be described in more detail below. The user of the image processing application can specify the warping tool 100 by providing user input specifying the shape of the perimeter 105, specifying the tool mesh 115, the strength of one or more of the associated vectors 120 and/or the direction of one or more of the vectors. The user input specifying the shape of the perimeter 105 can include input drawing or painting the perimeter 105 using conventional drawing or painting techniques, modifying a previously defined shape, and/or selecting a shape from a number of predefined shapes. The shape of the perimeter 105 specified by the user can be rotationally symmetric, such as a regular polygon (e.g., a triangle, square, hexagon, octagon, rhombus or other parallelepiped) or rotationally asymmetric. In addition, the user can also optionally specify a size of the warping tool 100, e.g., by enlarging or reducing the region of influence 110 of a previously specified warping tool 100.

The user can define the vectors 120 associated with the warping tool 100. The user can define one or more vectors 120, each of which originates at a mesh point of the tool mesh 115. The user can define the vectors 120 by defining a magnitude for each vector, which will be referred to as a strength, and a direction for each vector 120. In one implementation, the user can define any arbitrary value, within predetermined constraints, for the strength and the direction of each vector 120 in order to define the user specified warping tool 100. In an alternative implementation, the user can define the vectors by specifying a distribution for the strength and/or the direction, e.g., the user can select from predefined functions describing distributions of strengths/directions and optionally modify predefined parameters for the distributions. The distribution of the strength and/or the direction of the vectors can be any arbitrary distribution, including rotationally symmetric and rotationally asymmetric distributions. As described below, the strength and the direction of each vector 120 associated with the region of influence 110 are used to determine the effect when the warping tool is applied 100 to an image. The user can specify a warping tool that changes over time by specifying a shape that changes over time, or strength and/or direction of vectors that change over time. For example, the shape of the perimeter or the strength and/or direction of vectors can be defined as a function of time that a control button is depressed, dwell time of a cursor in a given location, or distance moved by a cursor in the image.

In one implementation, a user of the image processing application can specify a variety of different warping tools 100 to apply a variety of different warping effects. For example, for one effect the user can specify a warping tool with a rotationally symmetric shape and a rotationally asymmetric distribution of the strength and/or the directions for the associated vectors 120. For another effect, the user might specify a warping tool having a rotationally asymmetric shape and a rotationally symmetric distribution of the strength and/or the directions for the associated vectors 120. For still another effect, the user might specify a warping tool having a rotationally symmetric shape and a rotationally symmetric distribution of the strength and/or the directions for the associated vectors 120. In one implementation, the image processing application can be configured to allow the user to specify a warping tool 100 that produces the effect of scrambling, pushing, pulling, puckering, bloating, reflection, rotation, and/or shifting when the warping tool 100 is applied to an image.

In one implementation, the user applies the warping tool 100 by selecting a location in the image, and dragging a cursor representing the warping tool 100 along a trajectory from the selected location to another location in the image. Alternatively, the user can apply the warping tool 100 one or more times at the same location in the image without moving the warping tool 100.

Figure 2:
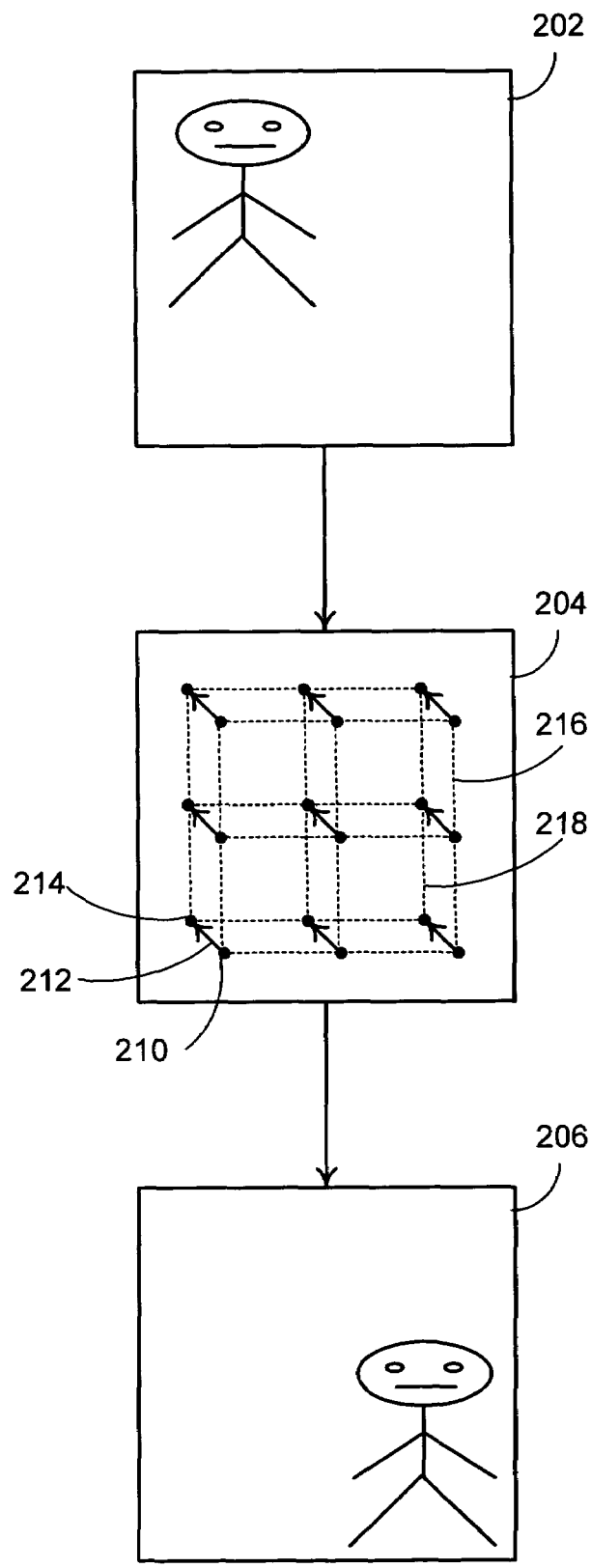
FIG. 2 graphically depicts a process for generating a destination image.

FIG. 2 graphically depicts a process 200 for modifying an image 202, referred to as the source image, by applying the warping tool 100. A modified image 206, referred to as the destination image, is associated with a distortion vector field 204. The vector field 204 includes a plurality of distortion vectors 212. Each distortion vector 212 begins at a destination mesh point 210 and ends at a source mesh point 214.

Each destination mesh point 210 is associated with a region in the destination image. The destination mesh points 210 collectively form a destination mesh 216. Each source mesh point 214 is associated with a region in the source image. The source mesh points 214 collectively form a distortion mesh 218. The distortion vector field 204 is used to sample from regions in the source image to generate regions in destination image 206. Each region in the source and destination image is associated with one or more pixels of the image.

In one implementation, sampling includes simply copying the pixels from regions in the source image to regions in the destination image according to the distortion vectors. In another implementation, sampling includes applying a predetermined weight function to the pixels copied. In FIG. 2, each distortion vector 210 points toward the upper left of its mesh point. Therefore, the objects in the source image appear to have moved toward the lower right in the destination image. The mesh can be repeatedly updated as the brush moves over the image.

Figure 3:
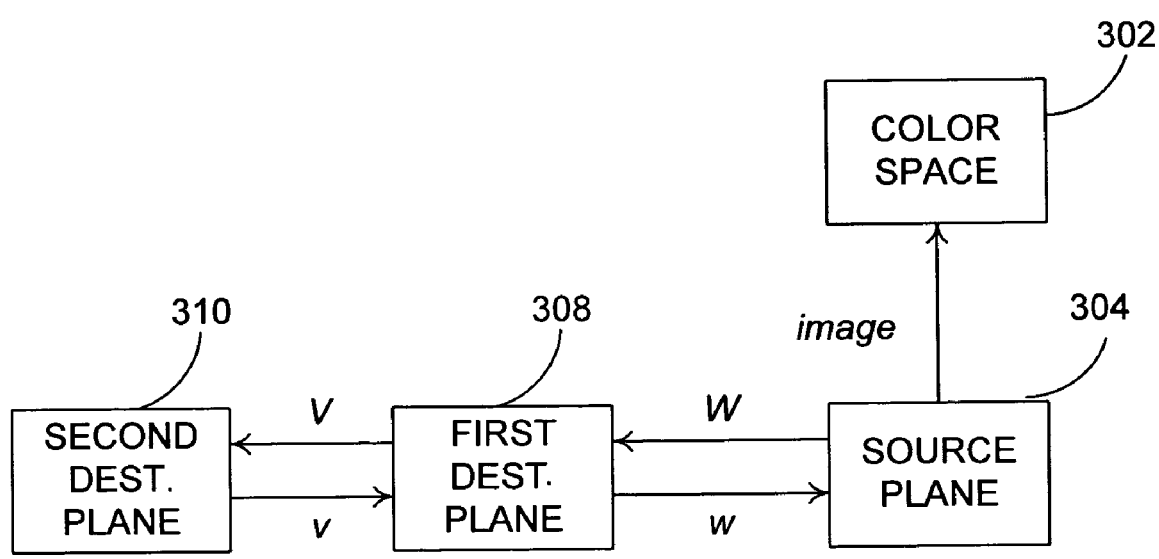
FIG. 3 depicts a process for producing a destination image by sampling or mapping from a source plane to a destination plane.

Referring to FIG. 3, a destination image is produced by sampling or simply mapping from the source image plane 304 to a color space 302. While this implementation is described in terms of image planes, the image can be defined on any sort of surface, such as a sphere, cylinder, and the like. The user first applies a warping tool to the source image to create a deformation W of the source plane to a first destination plane 308, where W is a set of distortion vectors describing the forward mapping. The system implements the warping as an inverse mapping w from the first destination plane to the source plane. The user then applies the warping brush a second time, to define a mapping V from the first destination plane to a second destination plane 310. The system implements the warping as an inverse mapping v. Further applications of the warping brush are handled in a similar manner, using further destination planes and inverse mappings. Mappings w and v can be implemented as distortion meshes, as described above.

Inverse mapping w is represented as a vector w=(p,q) at each point (x,y) of the first destination plane, where p and q are the horizontal and vertical components of w, respectively. Then w is represented as:

$$w=(p(x,y),q(x,y))$$

Inverse mapping v is represented as a "path segment vector" $v=(v_x, v_y)$ at each point (x,y) of the second destination plane, where $v_x$ and $v_y$ are the horizontal and vertical components of v, respectively. The direction of the path segment vector is opposite to the direction of movement of the brush cursor.

Figure 4:
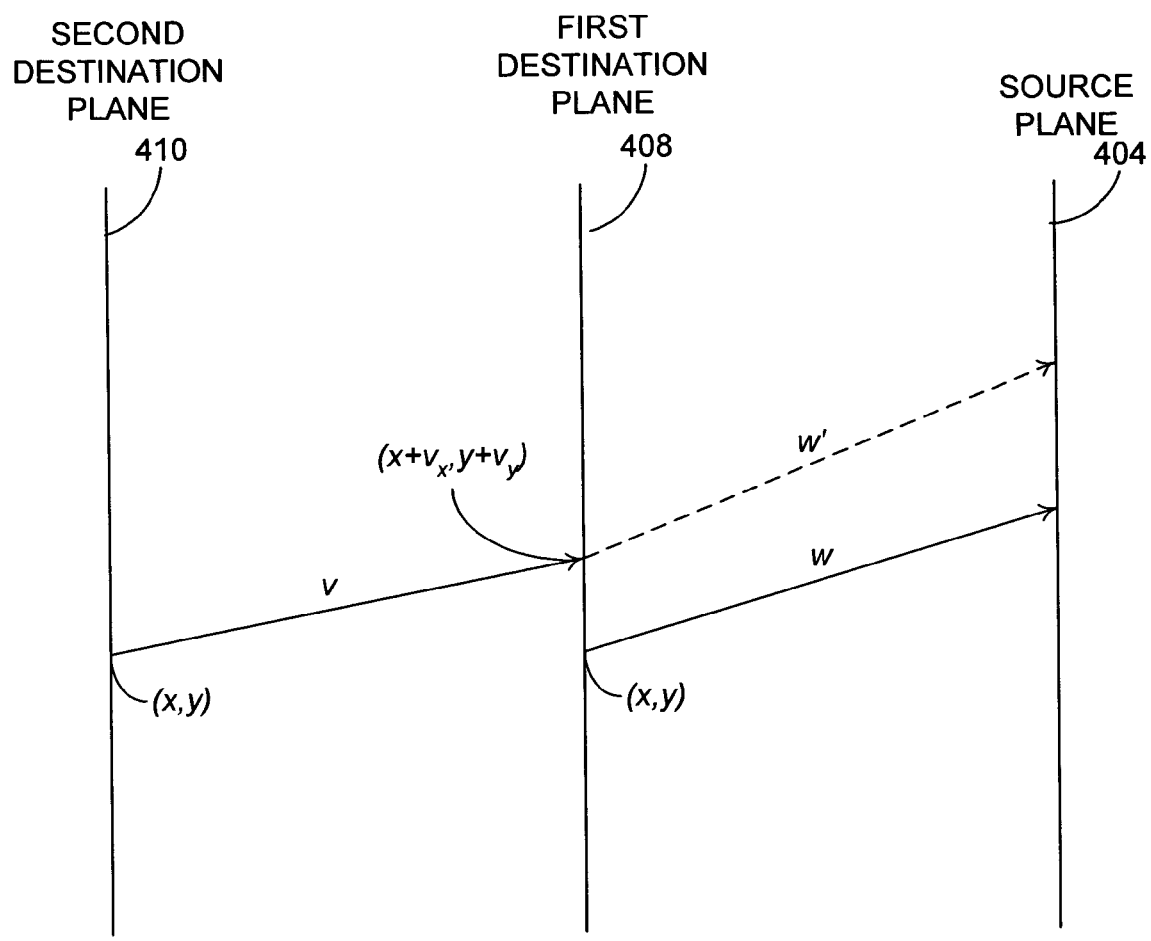
FIG. 4 presents a side view of the source plane and the destination plane illustrating the calculation of a distortion vector.

The system concatenates mappings v and w in the following manner. FIG. 4 presents a side view, sighted along the x-axis, of the source plane and destination planes. Vector v maps from a point (x,y) in the second destination plane to a point $(x+v_x, y+v_y)$ in the first destination plane. Vector w maps from a point (x, y) in the first destination plane to a point (x+p, y+q) in the source plane. The coordinate (x, y) is the location of a mesh point. FIG. 4 depicts the general case where vector v does not end at a mesh point.

Because vector v does not end at the mesh point where w is defined, the system interpolates to generate a vector w' that originates from the point $(x+v_x, y+v_y)$ between the mesh points in the first destination plane and describes the distortion at that point. The interpolation for the distortion vector can be linear, bilinear, or of higher order.

In general, the vector w' is approximated by a Taylor series expansion in two variables (x, y).

$$w' = w(x + v_x, x + v_y) \quad (1)$$

$$= w(x, y) + \frac{\partial w(x, y)}{\partial x} v_x + \frac{\partial w(x, y)}{\partial y} v_y + \frac{\partial^2 w}{\partial x \partial y} v_x v_y +$$

$$\frac{\partial^2 w}{\partial x^2} \frac{v_x^2}{2} + \frac{\partial^2 w}{\partial y^2} \frac{v_y^2}{2} + \frac{\partial^3 w}{\partial x^3} \frac{v_x^3}{6} + \frac{\partial^3 w}{\partial x^2 \partial y} \frac{v_x^2 v_y}{2} +$$

$$\frac{\partial^3 w}{\partial x \partial y^2} \frac{v_x v_y^2}{2} + \frac{\partial^3 w}{\partial y^3} \frac{v_y^3}{6} + \dots$$

In one implementation, the mesh points form squares, and so the mesh points are separated horizontally by a, and vertically by a. In other implementations, the mesh points can form rectangles, or can be arranged in more complex ways. The Taylor series can be approximated up to the first order as:

$$w' = w + \frac{w(x+a, y) - w(x, y)}{a} v_x + \frac{w(x, y+a) - w(x, y)}{a} v_y \quad (2)$$

Then the total distortion (p',q') is given by $$p' = v_x + p + \frac{p(x+a, y) - p}{a} v_x + \frac{p(x, y+a) - p}{a} v_y \quad (3)$$

$$q' = v_y + q + \frac{q(x+a, y) - q}{a} v_x + \frac{q(x, y+a) - q}{a} v_y \quad (4)$$

A better quality can be achieved at the expense of speed if higher order terms are used (in the above Taylor expansion). For example, by adding the next term in (1), $$\frac{\partial^2 w}{\partial x \partial y} v_x v_y$$

a bilinear interpolation can be obtained. Higher order interpolations can be obtained by adding further terms in the Taylor series.

The corresponding expressions involve more than two mesh points because of the higher derivatives. Also, other interpolation methods can be used and there is a wealth of literature on the subject. See for example G. Wolberg, "Digital Image Warping", chapter 5, for an approach focused on antialiasing.

As the user moves the warping tool, the movement of the warping tool is regularly sampled. For example, the movement can be sampled every 1/30$^{th}$ of a second. As each sample is taken, a path segment vector is generated. For example, a vector w is generated during the first sample, and a vector v is defined during a second sample. The system then concatenates vectors v and w, as described above to produce a new vector w, which will be concatenated with a vector generated during the next sample. The process repeats in this manner for each sample.

In one implementation, each warping tool stroke comprises a plurality of tiny tool movements, each referred to as a "sample." For each sample, a plurality of path segment vectors (referred to as a "path segment vector field") is generated. The path segment vector field is used to modify the distortion vector field. This process is repeated for each sample to produce a continuous effect.

In one implementation, a path segment vector is generated at each mesh point covered by the warping tool. The direction of a path segment vector is opposite to the direction of movement of the warping tool during the sample associated with that path segment vector. The vectors associated with the warping tool and the path segment vectors are combined using a weighted average and the combined vector is used to determine the inverse mapping from the destination plane to the source plane. In an alternative implementation, the warping tool is applied in the same position without moving the warping tool, e.g., a twirling tool applied repeatedly to obtain the desired twirling effect. The warping tool vectors for each application of the warping tool are concatenated to produce a new vector that is used to determine the inverse mapping from the destination plane to the source plane.

The warping tool 100 can be applied using a specified scale factor. The scale factor is used to scale the strength of the vectors 120 associated with the warping to modify the magnitude of the effect produced by the application of the warping tool 100.

The system can be configured to limit the effect of each warping tool stroke. In one implementation, the effect of each stroke is limited to the size of a mesh tile, which is the area between four adjacent mesh points. Consequently, the increments added to w at each warping tool stroke are limited in size. The x- and y-components of vector w are kept smaller than a. After repeated applications of the warping tool over one area, the distortion in that area reaches a state of stability, as described below. From the user's point of view, this results in a smear, which looks like a small area that gets stretched and greatly magnified in the direction of brushing. In terms of inverse mappings, the reason for this is that all of the distortion vectors in a line along the direction of brushing are sampling from the same pixel. Next this effect is described in more detail.

In a matrix representation equations (3) and (4) become $$\begin{pmatrix} p \\ q \end{pmatrix}_{new} = \begin{pmatrix} p \\ q \end{pmatrix}_{old} + \begin{pmatrix} 1 + \frac{p(x+a, y) - p}{a} & \frac{p(x, y+a) - p}{a} \\ \frac{q(x+a, y) - q}{a} & 1 + \frac{q(x, y+a) - q}{a} \end{pmatrix} \begin{pmatrix} v_x \\ v_y \end{pmatrix} \quad (5)$$

A new coordinate system x',y' is defined such that the x' axis is opposite in direction to the direction of the warping tool stroke and the y' axis is perpendicular to the warping tool stroke in the plane of the image. Now q'=0 and $v_y'$=0. Then equation (5) becomes (omitting the prime (') notation everywhere)

$$\begin{pmatrix} p \\ 0 \end{pmatrix}_{new} = \begin{pmatrix} p \\ 0 \end{pmatrix}_{old} + \begin{pmatrix} 1 + \frac{p(x+a, y) - p}{a} & \frac{p(x, y+a) - p}{a} \\ 0 & 1 \end{pmatrix} \begin{pmatrix} v_x \\ 0 \end{pmatrix} \quad (6)$$

Because the application of the warping tool is opposite to x, $v_x$>0, each warping tool stroke sample adds a little top. Assuming an initial state of w(x+a,y)=0, equation (6) becomes $$p_{new} = p + \left(1 - \frac{p}{a}\right) v_x \quad (7)$$

Let dp=$p_{new}$–p and dv=$v_x$. The system accumulates small distortions dp into a total distortion p $$dp = \left(1 - \frac{p}{a}\right) dv \quad (8)$$

Here the sum of all samples of warping tool movements dv is v and the current p=p(v). Equation (8) has a solution $$p = a\left(1 - e^{-\frac{v}{a}}\right) \quad (9)$$

Figure 5:
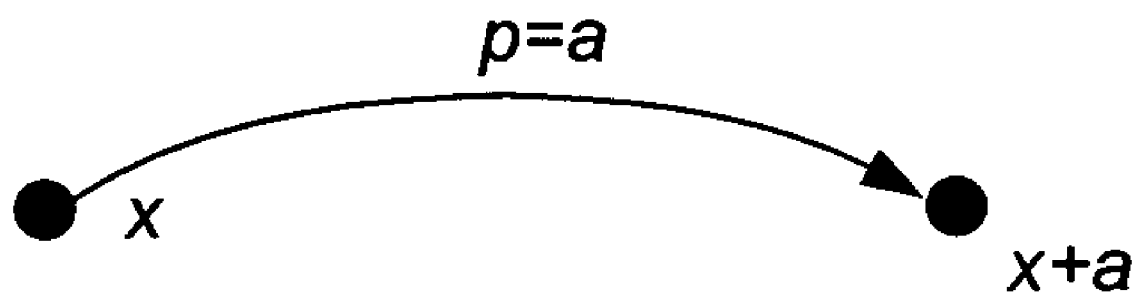
FIG. 5 depicts a distortion in a "state of stability" for 2 mesh points, for a forward warping brush.

Equation (9) shows that, as the user continues applying the warping tool at one single mesh point, p approaches the magnitude of the distance a to the next mesh point, but never exceeds a, and a state of stability is thus reached. In a similar manner, it can be shown that p will approach a for any mesh point. Therefore, the difference in distortion between two adjacent mesh points in the state of stability is equal to the distance between the mesh points. In the limit, p=a, as shown in FIG. 5. A vector p extending from a mesh point x to a mesh point x+a, thereby implementing the forward warping effect is described above.

For this reason, all of the distortion vectors in a line along the direction of application of the warping tool sample from the same pixel. This implements a forward warping tool, which can have two variations: a slipping tool and a sticky tool. The sticky tool is described above. The slipping brush is similar to the sticky brush, but each distortion is multiplied by a constant less than 1.

Figure 6:
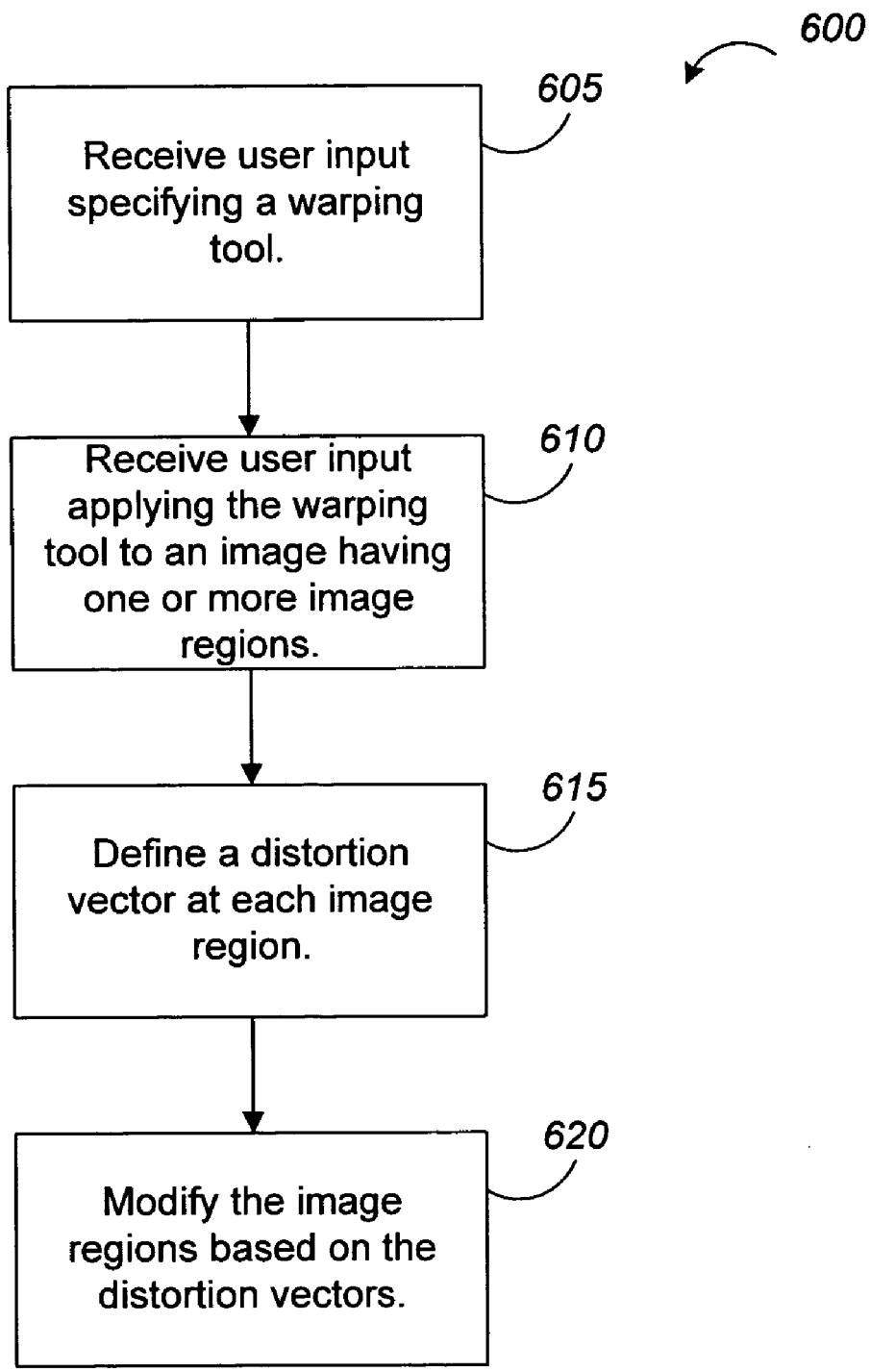
FIG. 6 is a flow diagram illustrating a method for modifying an image as a result of applying the user-specified warping tool.
Figure 7:
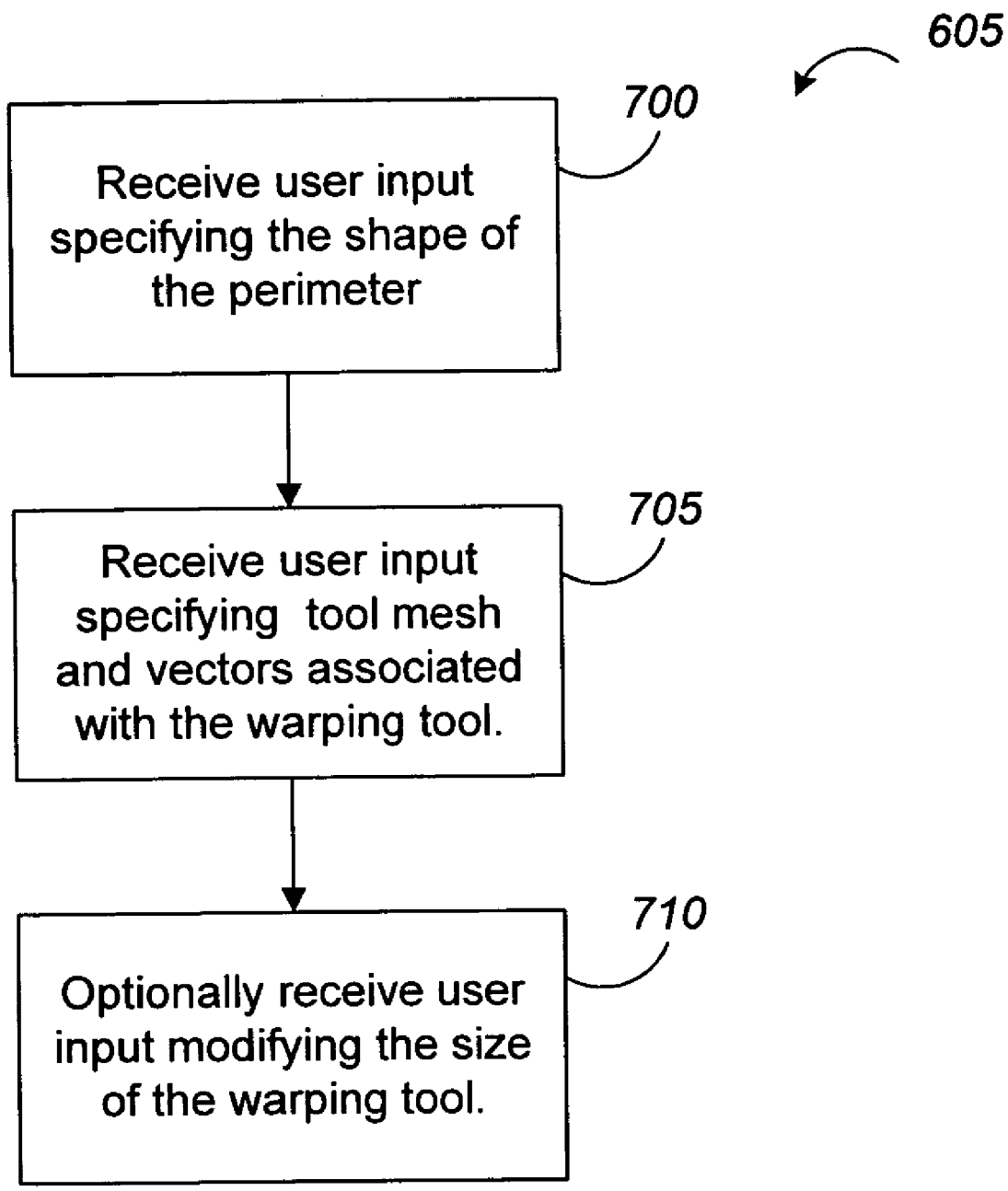
FIG. 7 is a flow diagram illustrating a method for specifying a warping tool.

FIG. 6 is a flow diagram illustrating a method 600 for modifying an image as a result of applying a user-specified warping tool 100. The method receives user input specifying a warping tool 100 (step 605). The user input can optionally allow the user to specify or modify the size of the warping tool 100. The user applies the warping tool to an image having one or more regions (step 610). The method defines a distortion vector at each image region covered by the warping tool as it is applied to the image (step 615). The image regions covered by the warping tool are modified based on the distortion vectors (step 620). FIG. 7 is a flow diagram illustrating a method for specifying the warping tool 100 in accordance with step 605 (FIG. 6). The user input specifies a shape of the warping tool perimeter 105 (step

700). As described above, the perimeter 105 defines a region of influence 110 for the warping tool 100. The user specifies a tool mesh 115 and one or more vectors 120 associated with the region of influence 110 (step 705). The user can define the vectors 120 for each pixel of an image covered by the warping tool 100 by specifying mesh 115 having mesh points 125 at mesh positions corresponding to the separation between adjacent pixels in an image. Alternatively, the user can specify a tool mesh 115 having a larger separation between the mesh points 125, such that the resulting vectors will be applied to multiple pixels in the image, and define one or more vectors 120 for each of the resulting plurality of subregions of the image. To define a vector 120, the user specifies a value for the strength and a direction for the vector 120. The user can define any arbitrary distribution of strength and direction for the vectors associated with the region of influence 110 in order to specify the warping tool 100. The user can also specify the size of the warping tool 100, for example, by selecting from a set of predefined tool sizes (which can represent, e.g., bounding boxes for the resulting tool) (step 710).

Alternatively, the user can specify a warping tool by selecting an image region having an associated distortion mesh (defined, e.g., as a result of a previous warping effect). Thus, the user can select a portion of the distortion mesh 216 for the warped image—for example, using conventional selection techniques to select a portion having a shape corresponding to the desired shape of the warping tool) and use the associated distortion vectors 212 as the vectors 120 for the warping tool 100. The user can also modify the distortion vectors 212 for the selected portion of the distortion mesh 216 to specify the desired warping tool 100.

Figure 8:
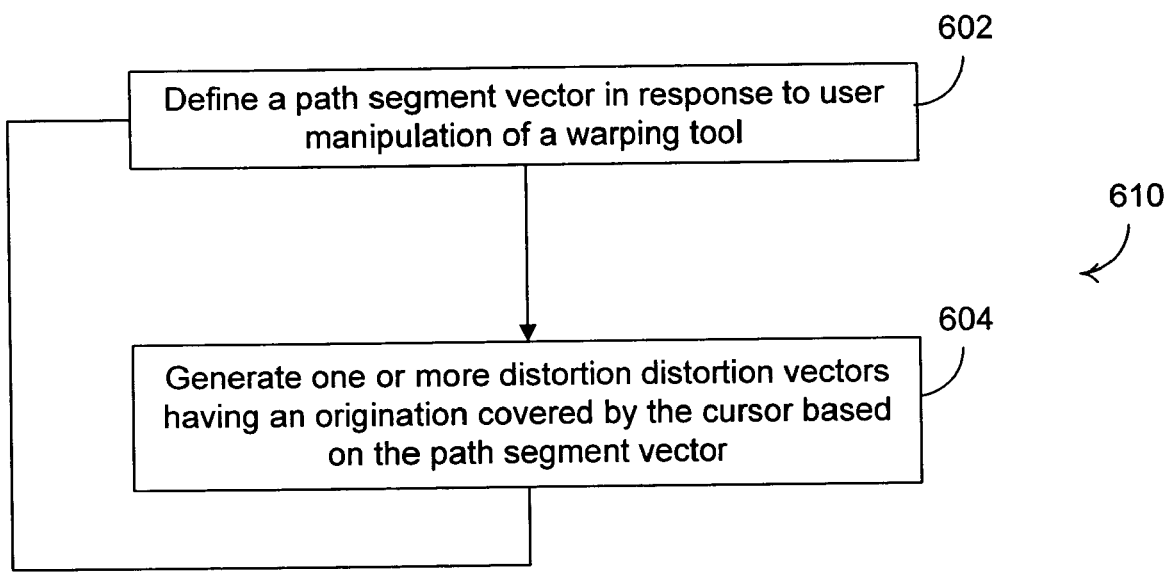
FIG. 8 is a flow diagram illustrating a method for modifying an image as a result of applying the user-defined warping tool.

FIG. 8 is a flow diagram illustrating a method for modifying an image as a result of applying the warping tool 100 in accordance with step 610 (FIG. 6). The method defines a path segment vector in response to user manipulation of the warping tool 100 (step 802). The method then generates one or more distortion vectors (that are part of the vector field) having originations covered by the warping tool 100 based on the path segment vector (step 804). As described above, each distortion vector has an origination at a destination mesh point 210. These steps are repeated as the user moves the warping tool to produce the modified image. The image modification process is represented in FIG. 4 and related text. If a scale factor is specified, the scale factor is used to scale the vectors 120 associated with the region of influence 110 and the scaled vectors 120 are used to generate the distortion vectors. In one implementation, the user can specify the scale factor during the application of the warping tool, e.g., by selecting or entering a value for the scale factor before the application of the warping tool.

Figure 9:
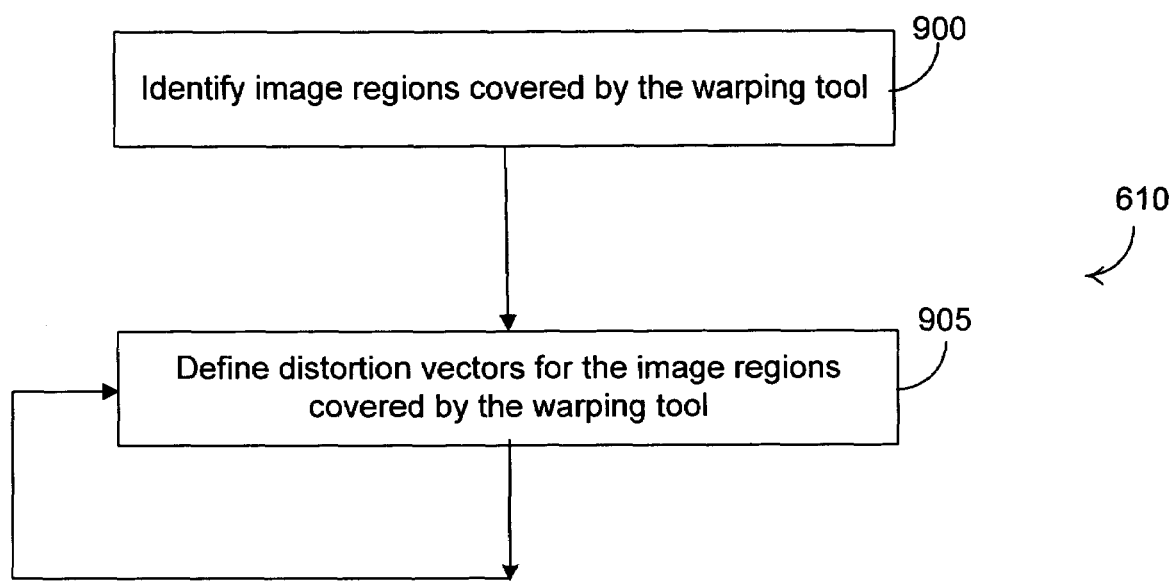
FIG. 9 is a flow diagram illustrating an alternate method for modifying an image as a result of applying the user-defined warping tool.

FIG. 9 is a flow diagram illustrating an alternative method for modifying an image as a result of applying the warping tool 100 in accordance with step 610 (FIG. 6). The method in FIG. 9 is used when the user applies the warping tool 100 to an image without moving the warping tool 100. The image regions covered by the warping tool 100 are identified (step 900), and the vector that is to be applied to each image region is calculated based on the vectors 120 associated with the region of influence 110. If a scale factor is specified, as described above, the vectors to be applied to each image region are scaled according to the scale factor. The distortion vector is calculated for each image region covered by the warping tool in accordance with the method represented in FIG. 4 and associated text. Step 905 is repeated for each application of the warping tool 100. Warping effects that can be produced by the method in FIG. 9 include scrambling, puckering, bloating, reflection, rotation, and shifting.

The warping tool 100 can also be used to perform de-warping, or reconstruction, of a previously warped image. Reconstruction is used to reduce a warping effect in an image warped by a previous application of a warping tool. Typically, the vectors associated with a warping tool 100 used for reconstruction have a direction perpendicular to the image plane and the strength of the vectors is used to scale down the distortion vectors associated with the regions of the image covered by the warping tool. If a scale factor is specified, the distortion vectors are also scaled based on the scale factor.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

What is claimed is:

1. A computer implemented method, comprising:
    receiving user input specifying a warping tool, the warping tool having a tool perimeter having a shape and a size, the warping tool having one or more associated tool vectors, each of the tool vectors originating at a mesh point defined by a tool mesh associated with the warping tool, the user input specifying one or more of the shape of the tool perimeter, the tool mesh, and the associated tool vectors, wherein the tool perimeter defines a region of influence for the warping tool;
    receiving user input moving the warping tool within an image;
    applying the warping tool, in response to user input, to the image; and
    modifying one or more distortion vectors for the image in response to the application of the warping tool, the one or more distortion vectors being within the region of influence when the warping tool is applied, the one or more distortion vectors being modified based at least in part on the one or more tool vectors.

2. The method of claim 1, further comprising:
    modifying one or more regions of the image using the one or more distortion vectors.

3. The method of claim 2 further comprising:
    repeatedly applying the warping tool and modifying image regions to produce a warping effect.

4. The method of claim 2, further comprising:
    displaying a representation of the modified image.

5. The method of claim 1, wherein receiving user input specifying the warping tool comprises:
    receiving user input specifying the tool mesh.

6. The method of claim 1, wherein receiving user input specifying the warping tool comprises:
    receiving user input defining a strength and/or direction of the one or more associated tool vectors.

7. The method of claim 6, wherein receiving user input defining the strength and/or direction comprises:
    receiving user input defining a rotationally asymmetric distribution for the strengths.

8. The method of claim 6, wherein receiving user input defining the strength and/or direction comprises:
    receiving user input defining a rotationally asymmetric distribution for the directions.

9. The method of claim 6, wherein receiving user input defining the strength and/or direction comprises:
    receiving user input defining a strength and/or direction that changes with time as the warping tool is applied to the image.

10. The method of claim 1, wherein receiving user input specifying the warping tool comprises:
    receiving user input specifying a rotationally asymmetric shape of the tool perimeter.

11. The method of claim 1, wherein receiving user input specifying the warping tool comprises:
    receiving user input specifying the shape of the tool perimeter.

12. The method of claim 1, wherein receiving user input specifying the warping tool comprises:
    receiving user input specifying a shape of the tool perimeter and/or a size that changes with time as the warping tool is applied to the image.

13. The method of claim 12, wherein receiving user input specifying the shape of the tool perimeter comprises:

receiving user input specifying a triangle, square, hexagon, octagon, rhombus, or parallelepiped.

14. The method of claim 1, wherein applying the warping tool comprises:
applying the warping tool in response to user input defining a movement of the warping tool from a first location to a second location relative to the image.

15. The method of claim 14, wherein modifying the one or more distortion vectors includes:
calculating a distortion vector for an image region based on the movement of the warping tool and based on one or more of the tool vectors.

16. The method of claim 15, wherein applying the warping tool includes:
applying the warping tool using a user specified scale factor, the scale factor being used to scale the strengths associated with the tool vectors.

17. A computer program product tangibly embodied in a computer readable medium, the computer program product comprising instructions operable to cause data processing equipment to:
receive user input specifying a warping tool, the warping tool having a tool perimeter having a shape and a size, the warping tool having one or more associated tool vectors, each of the tool vectors originating at a mesh point defined by a tool mesh associated with the warping tool, the user input specifying one or more of the shape of the tool perimeter, the tool mesh, and the associated tool vectors, wherein the tool perimeter defines a region of influence for the warping tool;
receive user input moving the warping tool within an image;
apply the warping tool, in response to user input, to the image; and
modify one or more distortion vectors for the image in response to the application of the warping tool, the one or more distortion vectors being within the region of influence when the warping tool is applied, the one or more distortion vectors being modified based at least in part on the one or more tool vectors.

18. The computer program product of claim 17, further comprising instructions operable to cause the data processing equipment to:
modify one or more regions of the image using the one or more distortion vectors.

19. The computer program product of claim 18, further comprising instructions operable to cause the data processing equipment to:
repeat the application of the warping tool and the modification of the image regions to produce a warping effect.

20. The computer program product of claim 18, further comprising instructions operable to cause the data processing equipment to:
display a representation of the modified image.

21. The computer program product of claim 17, wherein the instructions to receive user input specifying the warping tool cause the data processing equipment to:
receive user input specifying the tool mesh.

22. The computer program product of claim 17, wherein the instructions to receive user input specifying the warping tool cause the data processing equipment to:
receive user input defining a strength and/or direction of the one or more associated tool vectors.

23. The computer program product of claim 22, wherein the instructions to receive user input specifying the warping tool cause the data processing equipment to:
receive user input defining a rotationally asymmetric distribution for the strengths.

24. The computer program product of claim 22, wherein the instructions to receive user input specifying the warping tool cause the data processing equipment to:
receive user input defining a rotationally asymmetric distribution for the directions.

25. The computer program product of claim 22, wherein the instructions to receive user input specifying the warping tool cause the data processing equipment to:
receive user input defining a strength and/or direction that changes with time as the warping tool is applied to the image.

26. The computer program product of claim 17, wherein the instructions to receive user input specifying the warping tool cause the data processing equipment to:
receive user input specifying a rotationally asymmetric shape of the tool perimeter.

27. The computer program product of claim 17, wherein the instructions to receive user input specifying the warping tool cause the data processing equipment to:
receive user input specifying the shape of the tool perimeter.

28. The computer program product of claim 17, wherein the instructions to receive user input specifying the warping tool cause the data processing equipment to:
receive user input specifying a shape of the tool perimeter and/or a size that changes with time as the warping tool is applied to the image.

29. The computer program product of claim 28, wherein the instructions to receive user input specifying the shape of the tool perimeter cause the data processing equipment to:
receive user input specifying a triangle, square, hexagon, octagon, rhombus, or parallelepiped.

30. The computer program product of claim 17, wherein the instructions to apply the warping tool cause the data processing equipment to:
apply the warping tool in response to user input defining a movement of the warping tool from a first location to a second location relative to the image.

31. The computer program product of claim 30, wherein the instructions to modify the one or more distortion vectors cause the data processing equipment to:
calculate a distortion vector for an image region based on the movement of the warping tool and based on one or more of the tool vectors.

32. The computer program product of claim 31, wherein the instructions to apply the warping tool cause the data processing equipment to:
applying the warping tool using a user specified scale factor, the scale factor being used to scale the strengths associated with the tool vectors.

33. The method of claim 1, further comprising:
applying a warping effect to one or more pixels in the image using the one or more distortion vectors.

34. The computer program product of claim 17, further comprising instructions operable to cause the data processing equipment to:
apply a warping effect to one or more pixels in the image using the one or more distortion vectors.

35. A system comprising:
a processor;
a display device operatively coupled to the processor; and
a computer-readable medium, tangibly storing a computer program product, the computer program product comprising instructions to cause the processor to:

receive user input specifying a warping tool, the warping tool having a tool perimeter having a shape and a size, the warping tool having one or more associated tool vectors, each of the tool vectors originating at a mesh point defined by a tool mesh associated with the warping tool, the user input specifying one or more of the shape of the tool perimeter, the tool mesh, and the associated tool vectors, wherein the tool perimeter defines a region of influence for the warping tool;

receive user input moving the warping tool within an image;

apply the warping tool, in response to user input, to the image; and modify one or more distortion vectors for the image in response to the application of the warping tool, the one or more distortion vectors being within the region of influence when the warping tool is applied, the one or more distortion vectors being modified based at least in part on the one or more tool vectors.

36. The system of claim 35, wherein the computer program product further comprises instructions operable to cause the processor to:

modify one or more regions of the image using the one or more distortion vectors.

37. The system of claim 36, wherein the computer program product further comprises instructions operable to cause the processor to:

repeat the application of the warping tool and the modification of the image regions to produce a warping effect.

38. The system of claim 36, wherein the computer program product further comprises instructions operable to cause the processor to:

display a representation of the modified image.

39. The system of claim 35, wherein the instructions to receive user input specifying the warping tool cause the processor to:

receive user input specifying the tool mesh.

40. The system of claim 35, wherein the instructions to receive user input specifying the warping tool cause the processor to:

receive user input defining a strength and/or direction of the one or more associated tool vectors.

41. The system of claim 40, wherein the instructions to receive user input specifying the warping tool cause the processor to:

receive user input defining a rotationally asymmetric distribution for the strengths.

42. The system of claim 40, wherein the instructions to receive user input specifying the warping tool cause the processor to:

receive user input defining a rotationally asymmetric distribution for the directions.

43. The system of claim 40, wherein the instructions to receive user input specifying the warping tool cause the processor to:

receive user input defining a strength and/or direction that changes with time as the warping tool is applied to the image.

44. The system of claim 35, wherein the instructions to receive user input specifying the warping tool cause the processor to:

receive user input specifying a rotationally asymmetric shape of the tool perimeter.

45. The system of claim 35, wherein the instructions to receive user input specifying the warping tool cause the processor to:

receive user input specifying the shape of the tool perimeter.

46. The system of claim 35, wherein the instructions to receive user input specifying the warping tool cause the processor to:

receive user input specifying a shape of the tool perimeter and/or a size that changes with time as the warping tool is applied to the image.

47. The system of claim 46, wherein the instructions to receive user input specifying the shape of the tool perimeter cause the processor to:

receive user input specifying a triangle, square, hexagon, octagon, rhombus, or parallelepiped.

48. The system of claim 35, wherein the instructions to apply the warping tool cause the processor to:

apply the warping tool in response to user input defining a movement of the warping tool from a first location to a second location relative to the image.

49. The system of claim 48, wherein the instructions to modify the one or more distortion vectors cause the processor to:

calculate a distortion vector for an image region based on the movement of the warping tool and based on one or more of the tool vectors.

50. The system of claim 49, wherein the instructions to apply the warping tool cause the processor to:

applying the warping tool using a user specified scale factor, the scale factor being used to scale the strengths associated with the tool vectors.

51. The system of claim 35, wherein the computer program product further comprises instructions operable to cause the processor to:

apply a warping effect to one or more pixels in the image using the one or more distortion vectors.

* * * * *